US011870141B2

(12) United States Patent
Kim et al.

(10) Patent No.: US 11,870,141 B2
(45) Date of Patent: Jan. 9, 2024

(54) ANTENNA PACKAGE AND IMAGE DISPLAY DEVICE INCLUDING THE SAME

(71) Applicant: DONGWOO FINE-CHEM CO., LTD., Jeollabuk-do (KR)

(72) Inventors: Jong Min Kim, Gyeonggi-do (KR); Chang Jun Maeng, Gyeonggi-do (KR); Gi Taek Oh, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 50 days.

(21) Appl. No.: 17/545,408

(22) Filed: Dec. 8, 2021

(65) Prior Publication Data

US 2022/0190469 A1 Jun. 16, 2022

(30) Foreign Application Priority Data

Dec. 14, 2020 (KR) ........................ 10-2020-0174205

(51) Int. Cl.
*H01Q 1/38* (2006.01)
*H01Q 1/22* (2006.01)

(52) U.S. Cl.
CPC ................. *H01Q 1/38* (2013.01); *H01Q 1/22* (2013.01)

(58) Field of Classification Search
CPC ............ H01Q 1/38; H01Q 1/22; H01Q 1/364; H01Q 9/0414; H01Q 21/08; H01Q 1/24; H01Q 1/50; H01Q 21/00; H01Q 1/422; H01Q 1/48; H05K 1/028; H05K 1/189; H05K 3/4691; H05K 1/118; H05K 2201/09681; H05K 1/148
See application file for complete search history.

(56) References Cited

U.S. PATENT DOCUMENTS 7,417,593 B1 * 8/2008 Hsiao ........................ H01Q 9/42 343/702
9,485,860 B2 * 11/2016 Yosui ................... H05K 1/0333
11,277,915 B2 * 3/2022 Kim ........................ H01Q 21/08
11,606,453 B2 * 3/2023 Lee .......................... H01Q 1/38
2008/0007459 A1 * 1/2008 Koskiniemi ......... H01Q 9/0421 343/700 MS
2013/0328785 A1 * 12/2013 Brooks ................... G06F 1/169 345/170
(Continued)

FOREIGN PATENT DOCUMENTS

CN 101385193 A * 3/2009 ............. H01Q 1/243
CN 108376828 A * 8/2018 ........... H01Q 1/2258
(Continued)

*Primary Examiner* — Graham P Smith
*Assistant Examiner* — Jordan E. DeWitt
(74) *Attorney, Agent, or Firm* — The PL Law Group, PLLC

(57) ABSTRACT

An antenna package according to an embodiment of the present disclosure includes an antenna device including an antenna unit, and a flexible circuit board electrically connected to the antenna unit. The flexible circuit board includes a core layer having a first surface and a second surface that face each other, a circuit wiring layer disposed on the first surface of the core layer and including a signal wiring electrically connected to the antenna unit, and a ground layer disposed on the second surface of the core layer to cover the circuit wiring layer in a planar view. The ground layer partially includes a mesh structure.

11 Claims, 8 Drawing Sheets

(56) References Cited

U.S. PATENT DOCUMENTS

| | | | | |
|---|---|---|---|---|
| 2014/0002322 | A1* | 1/2014 | Kanome | H05K 1/0219 343/905 |
| 2017/0338864 | A1* | 11/2017 | Rolsted | A61M 5/31568 |
| 2018/0331430 | A1* | 11/2018 | Xiang | H01Q 9/0407 |
| 2019/0036207 | A1* | 1/2019 | Kim | H01Q 21/08 |
| 2019/0069788 | A1* | 3/2019 | Coleman | A61B 5/0015 |
| 2019/0252771 | A1* | 8/2019 | Yong | H01Q 21/22 |
| 2019/0327834 | A1* | 10/2019 | Kim | H01Q 1/245 |
| 2020/0021015 | A1* | 1/2020 | Yun | H01Q 1/2283 |
| 2020/0021016 | A1* | 1/2020 | Son | H01Q 21/065 |
| 2020/0036083 | A1* | 1/2020 | Kim | H01Q 21/08 |
| 2020/0112081 | A1* | 4/2020 | Kim | H01Q 1/243 |
| 2020/0127404 | A1* | 4/2020 | Seo | H01R 12/775 |
| 2020/0186180 | A1* | 6/2020 | Park | H01Q 9/16 |
| 2020/0266525 | A1* | 8/2020 | Kim | H01Q 1/243 |
| 2020/0350695 | A1* | 11/2020 | Kim | H01Q 21/08 |
| 2020/0403300 | A1* | 12/2020 | Kim | H01Q 9/0407 |
| 2021/0028539 | A1* | 1/2021 | We | H01Q 1/243 |
| 2021/0376493 | A1* | 12/2021 | Shah | H01Q 1/38 |
| 2021/0410274 | A1* | 12/2021 | Han | H01Q 1/2283 |
| 2022/0037800 | A1* | 2/2022 | Huang | H01Q 1/523 |
| 2022/0102870 | A1* | 3/2022 | Liu | H01Q 1/44 |
| 2022/0158329 | A1* | 5/2022 | Choi | H01Q 5/22 |
| 2022/0190469 | A1* | 6/2022 | Kim | H01Q 1/22 |
| 2022/0200132 | A1* | 6/2022 | Oh | H01Q 9/0407 |

FOREIGN PATENT DOCUMENTS

| | | | | | |
|---|---|---|---|---|---|
| CN | 109669511 | A | * | 4/2019 | G01S 13/34 |
| CN | 113946234 | A | * | 1/2022 | G06F 3/017 |
| CN | 114333562 | A | * | 4/2022 | H01Q 1/24 |
| CN | 216958484 | U | * | 7/2022 | G06F 1/1698 |
| DE | 102022204159 | A1 | * | 11/2022 | G06F 1/1698 |
| EP | 3657599 | A1 | * | 5/2020 | H01Q 1/22 |
| JP | 2016163120 | A | * | 9/2016 | |
| KR | 10-2013-0095451 | A | | 8/2013 | |
| KR | 10-2020-0010906 | A | | 1/2020 | |
| KR | 10-2020-0112793 | A | | 10/2020 | |
| WO | WO-2020071680 | A1 | * | 4/2020 | H01Q 1/22 |
| WO | WO-2020261920 | A1 | * | 12/2020 | H01Q 1/12 |

* cited by examiner

ANTENNA PACKAGE AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2020-0174205 filed on Dec. 14, 2020 in the Korean Intellectual Property Office (KIPO), the entire disclosures of which are incorporated by reference herein.

BACKGROUND

1. Field

The present invention relates to an antenna package and an image display device including the same. More particularly, the present invention relates to an antenna package including an antenna device and a circuit board and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

According to developments of a mobile communication technology, an antenna capable of implementing, e.g., high frequency or ultra-high frequency band communication is needed in the display device.

A circuit board for a power feeding and a transmission of control signal may be connected to the antenna for a radiation driving of the antenna. If a driving frequency of the antenna increases, a signal loss may be increased. As a length of a transmission path through the circuit board increases, the signal loss may be further increased.

The circuit board may be bent to be connected to, e.g., a driving integrated circuit chip. In this case, damages to circuit wirings and bonding failures with the antenna due to a bending stress may be caused.

Recently, as a thickness of the image display device to which the antenna is coupled recently decreases, a degree of bending of the circuit board may also increase. In this case, the above-described bending defects may be further aggravated. Thus, a construction of an antenna package to achieve reliability of the bending and circuit connection from the circuit board while maintaining or improving radiation properties of the antenna is needed.

For example, Korean Published Patent Application No. 2013-0095451 discloses an antenna integrated into a display panel, but does not suggest the efficient circuit connection as described above.

SUMMARY

According to an aspect of the present invention, there is provided an antenna package having improved mechanical reliability and signaling efficiency.

According to an aspect of the present invention, there is provided an image display device including an antenna package with improved mechanical reliability and signaling efficiency.

(1) An antenna package, including: an antenna device including an antenna unit; and a flexible circuit board electrically connected to the antenna unit, wherein the flexible circuit board includes: a core layer having a first surface and a second surface that face each other; a circuit wiring layer disposed on the first surface of the core layer, the circuit wiring layer including a signal wiring electrically connected to the antenna unit; and a ground layer disposed on the second surface of the core layer to cover the circuit wiring layer in a planar view, the ground layer partially including a mesh structure.

(2) The antenna package of the above (1), wherein the flexible circuit board has a bonding region bonded to the antenna device, a bending region and a body region, and the bending region is located between the bonding region and the body region, wherein the ground layer includes a bending portion that is disposed on a portion of the core layer in the bending region, and the bending portion has the mesh structure.

(3) The antenna package of the above (2), wherein the ground layer includes a first solid portion disposed on a portion of the core layer in the bonding region and a second solid portion disposed on a portion of the core layer in the body region.

(4) The antenna package of the above (3), wherein the bending portion includes a mesh pattern formed of the mesh structure and a solid pattern.

(5) The antenna package of the above (4), wherein the solid pattern overlaps the signal wiring in the planar view.

(6) The antenna package of the above (3), wherein the antenna unit includes a radiator, a transmission line extending from the radiator, a signal pad connected to one end portion of the transmission line and a ground pad disposed around the signal pad, and the circuit wiring layer of the flexible circuit board further includes a ground pattern disposed around one end portion of the signal wiring to overlap the ground pad in the planar view.

(7) The antenna package of the above (6), further including a via structure penetrating the core layer and connecting the ground pattern and the first solid portion of the ground layer to each other.

(8) The antenna package of the above (2), wherein the antenna device includes a plurality of antenna units, and the signal wiring of the circuit wiring layer includes a plurality of signal wirings, each of which independently connected to each of the plurality of antenna units.

(9) The antenna package of the above (8), wherein the signal wiring includes a bent portion, and the bent portion is disposed on a portion of the core layer in the bonding region.

(10) The antenna package of the above (9), wherein the plurality of signal wirings extend in a length direction of the flexible circuit board continuously on the bending region and the body region of the core layer.

(11) The antenna package of the above (9), further including an antenna driving integrated circuit chip disposed under the antenna device, and the flexible circuit board is bent under the antenna device by the bending region to be electrically connected to the antenna driving integrated circuit chip by the body region.

(12) The antenna package of the above (11), further including an intermediate circuit board on which the antenna driving integrated circuit chip is mounted, wherein the intermediate circuit board is connected to the body region of the flexible circuit board.

(13) An image display device, including: a display panel; and the antenna package according to embodiments as described above disposed on the display panel.

(14) The image display device of the above (13), further including an antenna driving integrated circuit chip disposed under the display panel, wherein a portion of the flexible circuit board including the mesh structure in the antenna package is bent to be electrically connected to the antenna driving integrated circuit chip.

In an antenna package according to exemplary embodiments of the present invention, a flexible circuit board connected to an antenna device may include a circuit wiring layer and a ground layer formed on a bottom surface and a top surface, respectively, of a core layer of the flexible circuit board. The ground layer may overlap a signal wiring included in the circuit wiring layer in a planar view to promote a generation of an electric field. Accordingly, a signal loss by the flexible circuit board may be suppressed and a feeding efficiency to the antenna device may be improved.

In exemplary embodiments, the ground layer of the flexible circuit board may partially include a mesh structure. The mesh structure may be disposed in a bending region of the flexible circuit board to improve a bending stability of the flexible circuit board.

The mesh structure may be included in a bending portion of the flexible circuit board, and the bending portion may further include a solid pattern portion together with the mesh structure. The solid pattern portion may overlap the signal wiring in a planar view to promote a formation of an electric field in the bending portion, thereby suppressing a signal loss due to the introduction of the mesh structure.

DETAILED DESCRIPTION

According to exemplary embodiments of the present invention, there is provided an antenna package including a combination of an antenna device and a flexible circuit board that includes a ground layer. According to exemplary embodiments of the present invention, there is also provided an image display device including the antenna package.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms “first”, “second”, “upper”, “lower”, “top”, “bottom”, etc., used herein do not designate an absolute position, but are relatively used to distinguish different elements or different positions.

Figure 1:
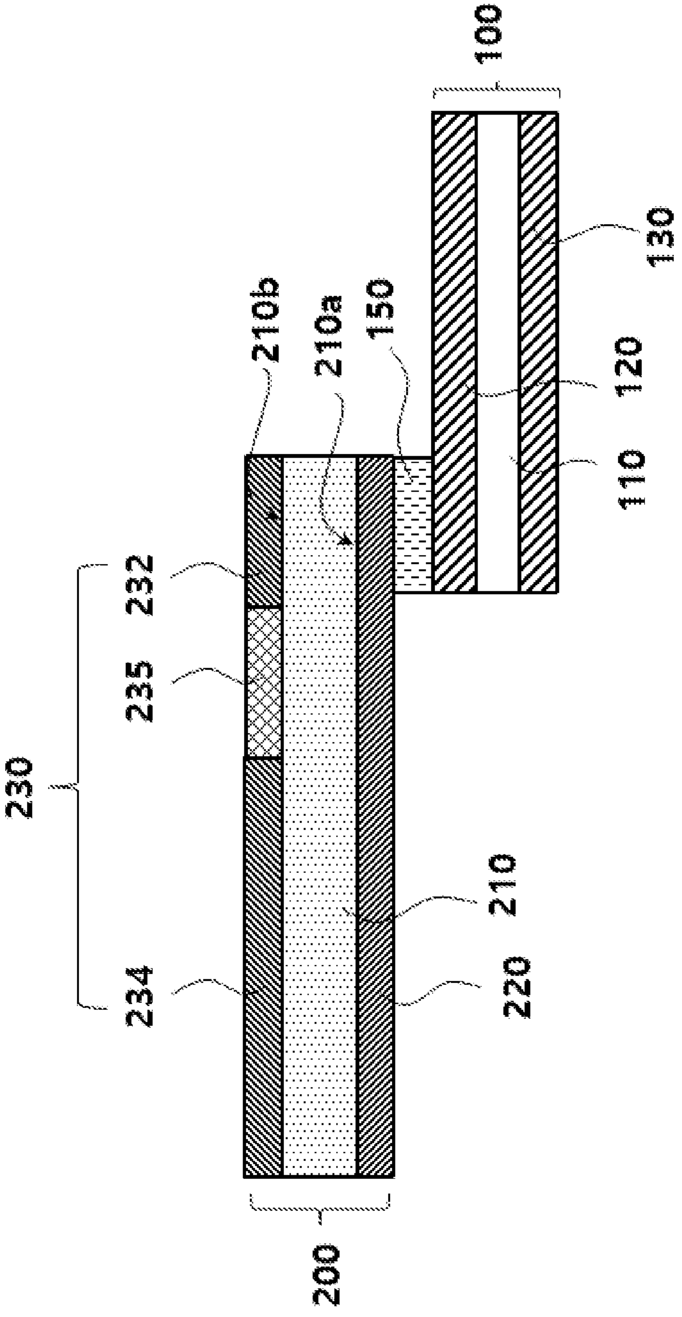
FIGS. 1 to 3 are a schematic cross-sectional view and top planar views illustrating an antenna package in accordance with exemplary embodiments.
Figure 2:
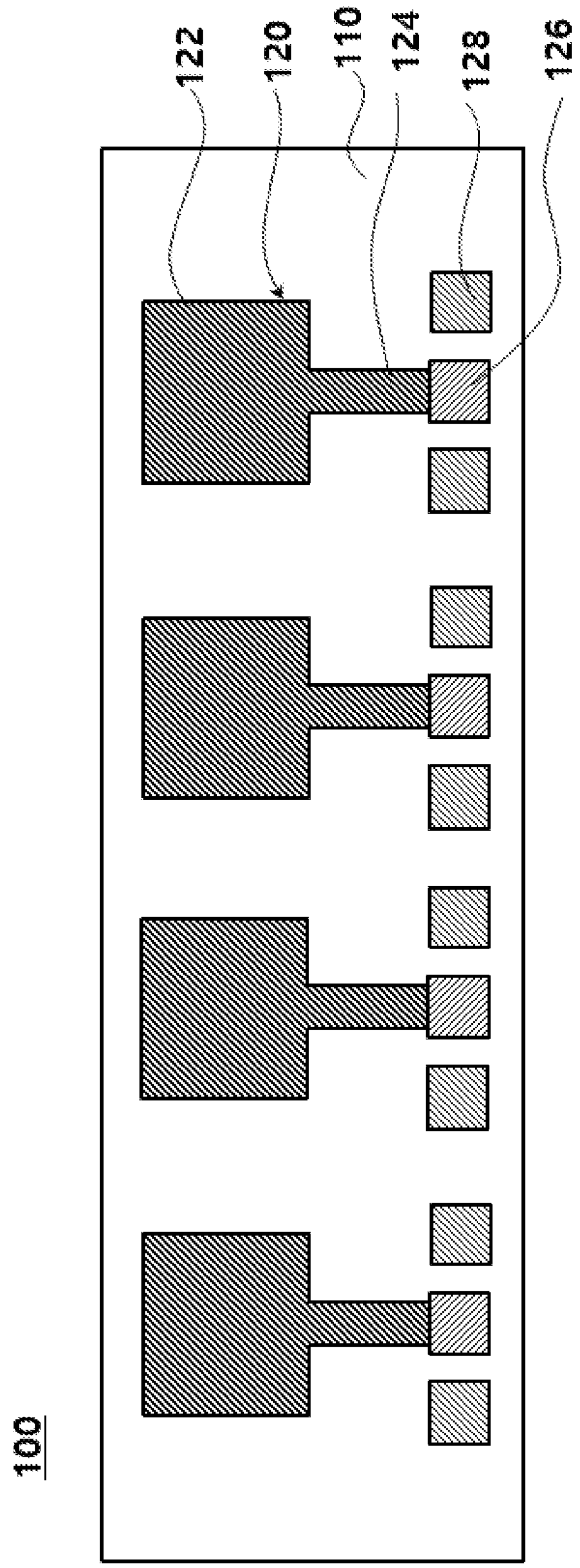
Figure 3:
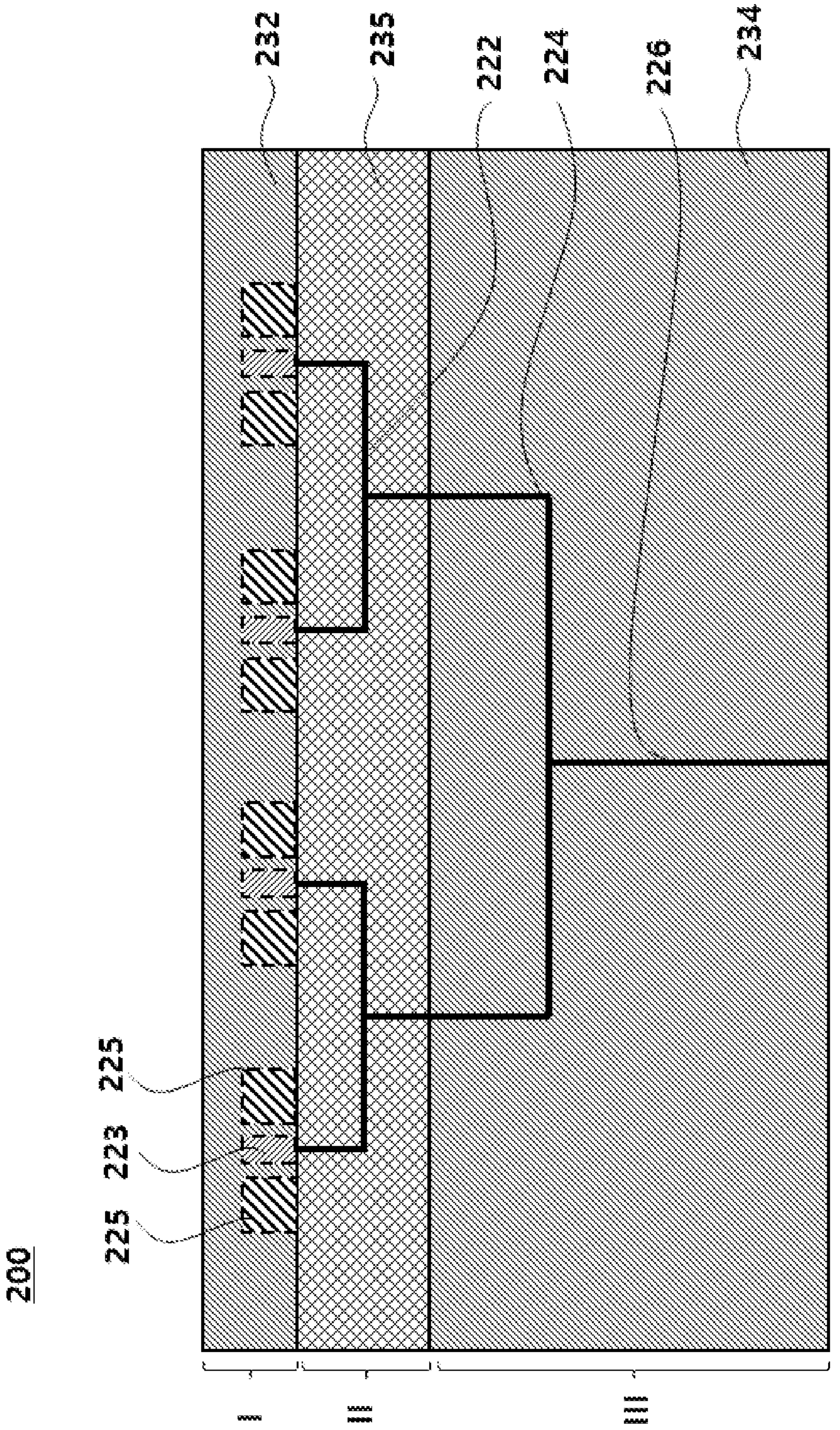

FIGS. 1 to 3 are a schematic cross-sectional view and top planar views illustrating an antenna package in accordance with exemplary embodiments. Specifically, FIG. 1 is a schematic cross-sectional view illustrating the antenna package. FIG. 2 is a schematic top planar view illustrating an antenna device included in the antenna package. FIG. 3 is a schematic top planar view illustrating a flexible circuit board included in the antenna package. FIG. 3 is a top planar view in which a circuit wiring layer and a ground layer of the flexible circuit board are projected together.

Referring to FIG. 1, the antenna package may include an antenna device 100 and a flexible circuit board 200 (e.g., a flexible printed circuit board (FPCB)). The flexible circuit board 200 may include a core layer 210 and a conductive layer formed on a surface of the core layer 210. The conductive layer may include, e.g., a metal plating layer such as a copper plating layer.

The conductive layer may include a circuit wiring layer 220 and a ground layer 230. In exemplary embodiments, the core layer 210 may include a first surface 210*a* (e.g., a bottom surface) and a second surface 210*b* (e.g., an upper surface) facing each other. The circuit wiring layer 220 and the ground layer 230 may be formed on the first surface 210*a* and the second surface 210*b*, respectively, of the core layer 210.

The core layer 210 may include, e.g., a flexible resin such as polyimide resin, modified polyimide (MPI), an epoxy resin, polyester, a cycloolefin polymer (COP), a liquid crystal polymer (LCP), or the like. The core layer 210 may include an internal insulating layer included in the circuit board 200.

Referring to FIG. 2, the antenna device 100 may include an antenna dielectric layer 110 and an antenna unit 120 disposed on the antenna dielectric layer 110.

The antenna dielectric layer 110 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive film such as an optically clear adhesive (OCA) or an optically clear resin (OCR) may be included in the antenna dielectric layer 110. In some embodiments, the antenna dielectric layer 110 may include an inorganic insulating material such as silicon oxide, silicon nitride, silicon oxynitride, glass, or the like.

In some embodiments, a dielectric constant of the antenna dielectric layer 110 may be adjusted in a range from about 1.5 to about 12. When the dielectric constant exceeds about 12, a driving frequency may be excessively decreased, so that driving in a desired high or ultra-high frequency band may not be implemented.

The antenna unit 120 may be formed on a top surface of the antenna dielectric layer 110. For example, a plurality of the antenna units 120 may be arranged in an array form along a width direction of the antenna dielectric layer 110 or the antenna package to form an antenna pattern row.

The antenna unit 120 may include a radiator 122 and a transmission line 124. The radiator 122 may have, e.g., a polygonal plate shape, and the transmission line 124 may extend from a side of the radiator 122. The transmission line 124 may be formed as a single member substantially integral with the radiator 122, and may have a width smaller than that of the radiator 122.

The antenna unit 120 may further include a signal pad 126. The signal pad 126 may be connected to one end portion of the transmission line 124. In an embodiment, the signal pad 126 may be formed as a member substantially integral with the transmission line 124, and an terminal end portion of the transmission line 124 may serve as the signal pad 126.

In some embodiments, a ground pad 128 may be disposed around the signal pad 126. For example, a pair of ground pads 128 may be disposed to face each other with the signal pad 126 interposed therebetween.

For example, the ground pad 128 may be electrically and physically separated from the transmission line 124 and the signal pad 126. The ground pad 128 may serve as a bonding pad that improves bonding stability with a conductive bonding structure 150.

In exemplary embodiments, the antenna unit or the radiator 122 may be designed to have a resonance frequency corresponding to high frequency or ultra-high frequency band such as 3G, 4G, 5G or higher band. In a non-limiting example, the resonance frequency of the antenna unit may be about 10 GHz or more, or from about 20 GHz to 40 GHz (e.g., about 28 GHz or about 38 GHz).

The antenna unit 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

In an embodiment, the antenna unit 120 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 120 may include a transparent conductive oxide such as indium tin oxide (ITO), indium zinc oxide (IZO), zinc oxide (ZnOx), indium zinc tin oxide (IZTO), etc.

In some embodiments, the antenna unit 120 may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In some embodiments, the radiator 122 and the transmission line 124 may have a mesh-pattern structure to improve a transmittance. In this case, a dummy mesh electrode (not illustrated) may be formed around the radiator 122 and the transmission line 124.

The signal pad 126 and the ground pad 128 may be a solid pattern formed of the above-described metal or alloy in consideration of a feeding resistance reduction, a noise absorption efficiency, etc. In an embodiment, at least a portion of the transmission line 124 may include a solid structure.

The antenna unit 120 may include a blackened portion, so that a reflectance at a surface of the antenna unit 120 may be decreased to suppress a visual recognition of the antenna unit due to a light reflectance.

In an embodiment, a surface of the metal layer included in the antenna unit 120 may be converted into a metal oxide or a metal sulfide to form a blackened layer. In an embodiment, a blackened layer such as a black material coating layer or a plating layer may be formed on the antenna unit 120 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In some embodiments, the antenna ground layer 130 may be formed on a bottom surface of the antenna dielectric layer 110. The antenna ground layer 130 may overlap the radiator 122 of the antenna unit 120 in a thickness direction. An electric field or inductance may be generated between the radiator 122 and the antenna ground layer 130 so that a substantially vertical radiation antenna may be implemented.

In an embodiment, the antenna ground layer 130 may entirely cover the radiator in a planar view and may not overlap the pads 126 and 128.

The antenna ground layer 130 may include the above-described metal and/or alloy. In some embodiments, the antenna ground layer 130 may be included as an independent element of the antenna device 100. In some embodiments, a conductive member of an image display device to which the antenna device 100 is employed may serve as the antenna ground layer 130.

The conductive member may include, e.g., a gate electrode of a thin film transistor (TFT), various wirings such as, a scan line or a data line, or various electrodes such as a pixel electrode and a common electrode.

In an embodiment, various structures including, e.g., a conductive material disposed under a display panel may serve as an antenna ground layer 130. For example, a metal plate (e.g., a stainless-steel plate such as a SUS plate), a pressure sensor, a fingerprint sensor, an electromagnetic wave shielding layer, a heat dissipation sheet, a digitizer, etc., may serve as the antenna ground layer 130.

In an embodiment, the ground layer 230 of the flexible circuit board 200 may face the antenna unit 110. In this case, the ground layer 230 may be formed on the first surface 210*a* of the core layer 210, and the circuit wiring layer 220 may be formed on the second surface 210*b* of the core layer 210.

For example, the circuit wiring layer 220 may be electrically connected to the antenna unit 120 through a via structure or a contact penetrating the core layer 210.

Referring to FIG. 3, the flexible circuit board 200 may include a bonding region I, a bending region II and a body region III. The bonding region I may be a region in which the signal pad 126 of the antenna device 100 and the circuit wiring layer 220 of the flexible circuit board 200 are electrically connected or bonded to each other.

As described above, the circuit wiring layer 220 may be formed on the first surface 210*a* of the core layer 210. The circuit wiring layer 220 may include signal wirings 222, 224 and 226.

In some embodiments, at least two antenna units 120 may be coupled by the signal wirings 222, 224 and 226. For example, the signal wirings 222, 224 and 226 may include, e.g., merged wirings 222 and 224 and a driving signal wiring 226.

The merged wirings 222 and 224 may include a first merged wiring 222 and a second merged wiring 224. The first merged wiring 222 may be bonded to the signal pad 126 of the antenna unit 120. For example, two radiators 120 may be coupled through the first merged wiring 222 to form a radiation group. The second merged wiring 224 may be connected to a plurality of the first merged wirings 222 to couple a plurality of radiation groups to each other.

One end portion of the driving signal wiring 226 may be branched from the second merged wiring 224. The driving signal wiring 226 may extend on a portion of the core layer 210 of the body region III, and the other end portion of the driving signal wiring 226 may be electrically connected to an antenna driving integrated circuit (IC) chip.

In some embodiments, the first merged wiring 222 extends on a portion of the core layer 210 of the bending region II, and the second merged wiring 224 may extend on portions of the core layer 210 throughout the bending region II and the body region III.

As described above, one end portion of the signal wiring (e.g., the first merged wiring 222) may be bonded to the signal pad 126 of the antenna unit 120 in the bonding region I.

For example, a conductive bonding structure 150 (e.g., anisotropic conductive film (ACF)) may be disposed on the pads 126 and 128 of the antenna unit 120, and the bonding region I of the flexible circuit board 200 may be attached on the conductive bonding structure 150. Thereafter, the electrical connection between the signal wirings 222, 224 and 226 and the signal pads 126 may be implemented through a bonding process including a heating/pressurizing process.

In an embodiment, a bonding pad 223 may be formed at each terminal end of the first merged wiring 222. In this case, the bonding pad 223 and the signal pad 126 may be electrically connected to each other. In an embodiment, one end portion of the first merged wiring 222 may be directly provided as the bonding pad 223.

In an embodiment, the circuit wiring layer 220 may further include a ground pattern 225. For example, the ground pattern 225 may be disposed around the terminal end of the first merged wiring 222 or the bonding pad 223.

The ground pattern 225 may be aligned over the ground pad 128 of the antenna device 100. The ground pattern 225 may also be electrically connected to the ground pad 128 of the antenna device 100 through the conductive bonding structure 150.

As described above, the ground layer 230 may be formed on the second surface 210*b* of the core layer 210. In exemplary embodiments, a portion of the ground layer 230 included in the bending region II may include a mesh structure. Accordingly, the ground layer 230 may include a bending portion 235 having the mesh structure.

A remaining region of the ground layer 230 except for the bending region II may have a solid structure. For example, the ground layer 230 may include a first solid portion 232 included in the bonding region I and a second solid portion 234 included in the body region III. The bending portion 235 having the mesh structure may be located between the first solid portion 232 and the second solid portion 234 in a planar view.

The ground layer 230 may substantially be entirely superimposed over the circuit wiring layer 220 in the planar view. In some embodiments, the first solid portion 232 may cover the bonding pad 223 and the ground pattern 225 of the circuit wiring layer 220 in the planar view. The bending portion 235 may cover the first merged wiring 222 and may also partially cover the second merged wiring 224 in the planar view. The second solid portion 226 may entirely cover the driving signal wiring 226, and may also partially cover the second merged wiring 224 in the planar view.

For example, the flexible circuit board 200 may be bent by the bending portion 235 of the flexible circuit board 200 to connect the antenna driving IC chip disposed under the display panel and the driving signal wiring 226 with each other As described above, the bending portion 235 may include the mesh structure to have relatively high flexibility.

Further, the ground layer 220 may entirely cover the signal wirings 222, 224 and 226 in the planar view, so that an electric field may be generated between the signal wirings 222, 224 and 226 and the ground layer 220 to improve a feeding efficiency to the antenna unit 120. A portion of the ground layer 220 except for the bending portion 235 may have the solid structure, so that the generation of the electric field from coupling with the signal wirings 222, 224 and 226 may be promoted.

Figure 4:
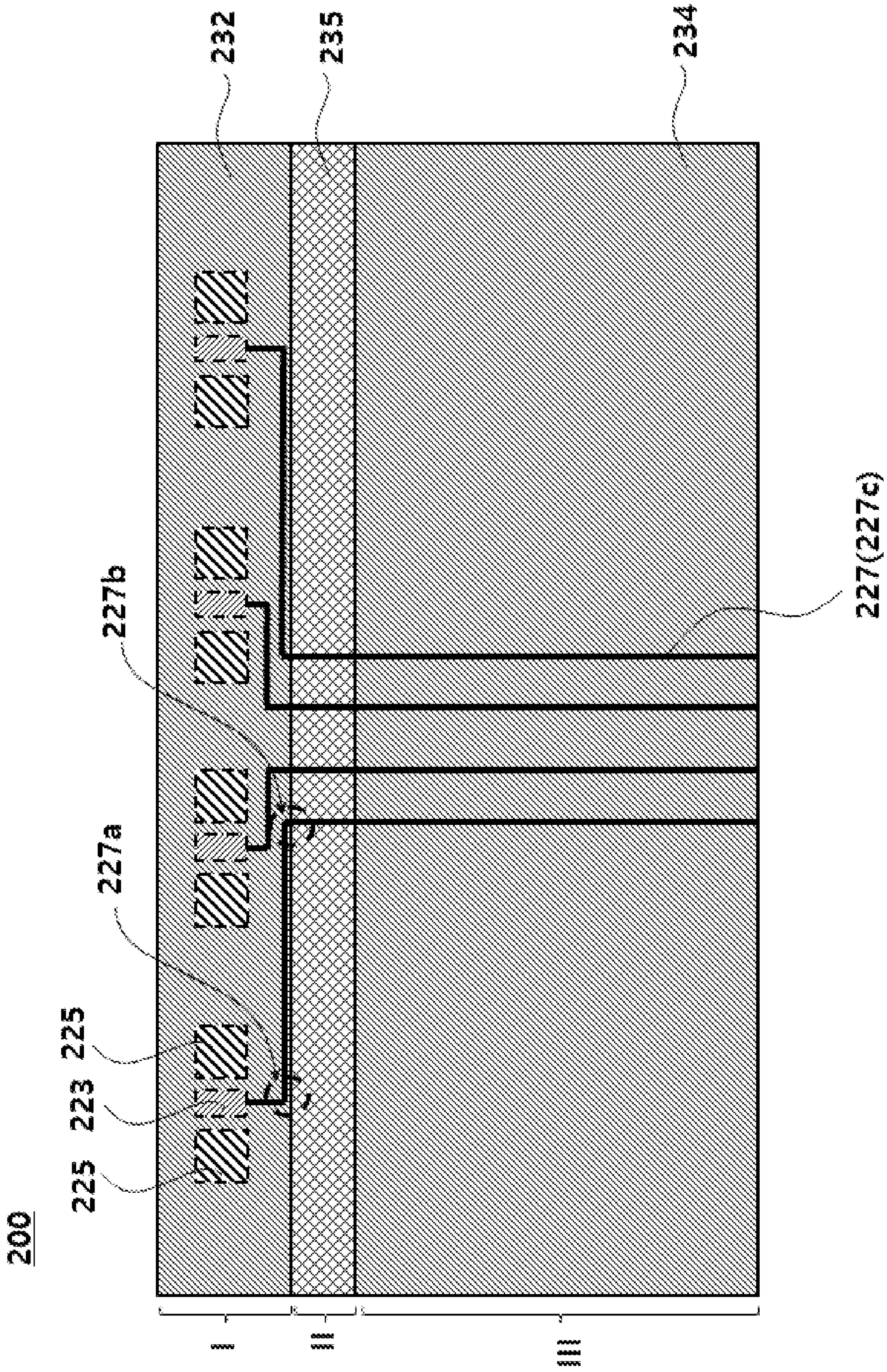
FIG. 4 is a schematic top planar view illustrating a flexible circuit board included in an antenna package in accordance with exemplary embodiments.

FIG. 4 is a schematic top planar view illustrating a flexible circuit board included in an antenna package in accordance with exemplary embodiments.

Referring to FIG. 4, the circuit wiring layer 220 may include signal wirings 227 that are individually and independently connected to each of the antenna units 120. One ends of the signal wirings 227 may each be bonded to the signal pad 126 of the antenna unit 120, and the other end portions of the signal wirings 227 may each be electrically connected to the antenna driving IC chip at an end portion of the body region III of the flexible circuit board 200.

Accordingly, a feeding and control signal may be applied to each of the antenna units 120 through each signal wiring 227 from the antenna driving IC chip.

In some embodiments, the signal wirings 227 may include bent portions 227*a* and 227*b* as indicated by dotted circles. The signal wirings 227 may be assembled with a narrower interval using the bent portions 227*a* and 227*b* to extend on a portion of the core layer 210 in the body region III.

For example, the bent portions 227*a* and 227*b* may include a first bent portion 227*a* and a second bent portion 227*b*. The signal wiring 227 may branch in a length direction from the bonding pad 223 and then extend in a width direction by the first bent portion 227*a*. The signal wiring 227 may extend again in the length direction by the second bent portion 227*b*.

In some embodiments, the bending portion 235 and the second solid portion 234 of the ground layer 230 may overlap an extension portion 227*c* extending in the length direction of the signal wiring 227 in the planar view.

As described above, the bending portion 235 may have a mesh structure and may improve bending stability of the flexible circuit board 200. Further, the bent portions 227*a* and 227*b* may be excluded from the bending region II, and mechanical damages to the signal wiring 227 due to a bending stress of the flexible circuit board 200 may be suppressed.

Figure 5:
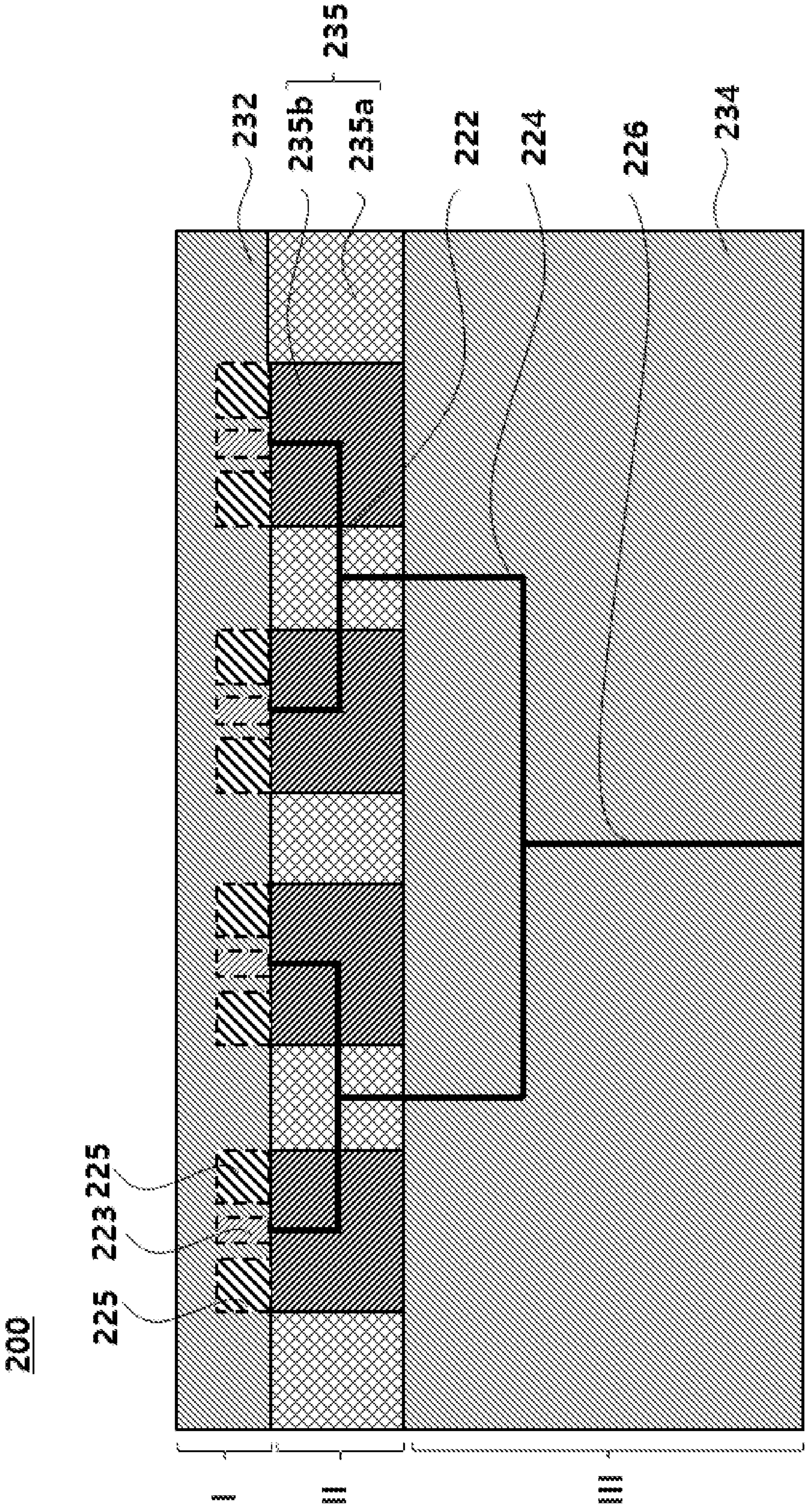
FIGS. 5 and 6 are schematic top planar views illustrating flexible circuit boards included in an antenna package in accordance with some exemplary embodiments.
Figure 6:
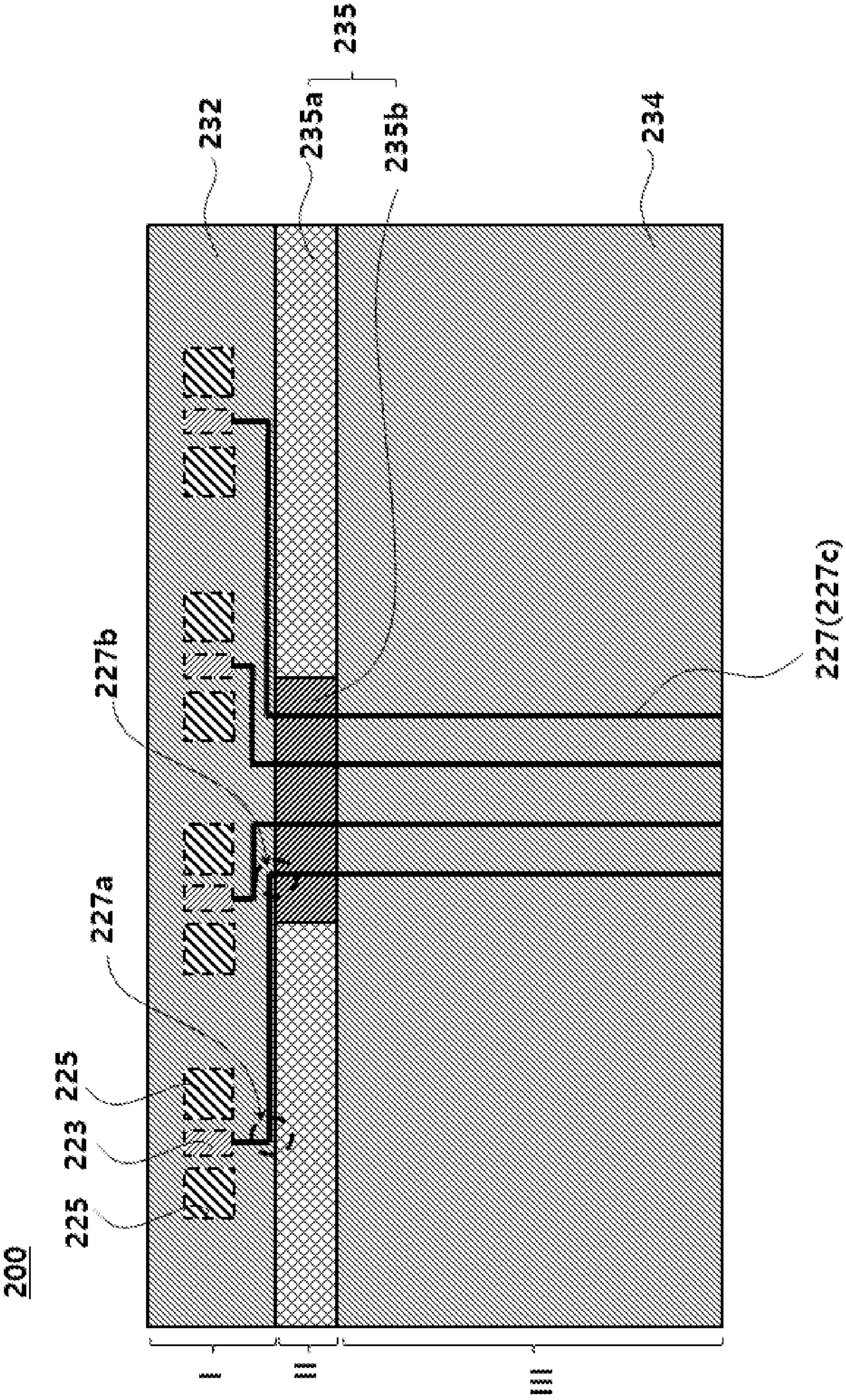

FIGS. 5 and 6 are schematic top planar views illustrating flexible circuit boards included in an antenna package in accordance with some exemplary embodiments.

Referring to FIGS. 5 and 6, the bending portion 235 included in the ground layer 230 of the flexible circuit board 200 may include a solid structure together with a mesh structure. For example, the bending portion 235 may include a mesh pattern 235*a* and a solid pattern 235*b*.

In exemplary embodiments, the solid pattern 235*b* may overlap the signal wiring of the circuit wiring layer 220 in the planar view.

As illustrated in FIG. 5, the solid pattern 235*b* may overlap, e.g., the first merged wiring 222. As illustrated in FIG. 6, the solid pattern 235*b* may overlap the extension portions 227*c* of the signal wirings 227.

The solid structure may be introduced into a region of the bending portion 235 overlapping the signal wiring, so that the generation of the electric field through the ground layer 230 may be further promoted. Additionally, the region of the bending portion 235 except for the solid pattern 235*b* may include the mesh pattern 235*a* so that bending properties in the bending region II may be improved.

Figure 7:
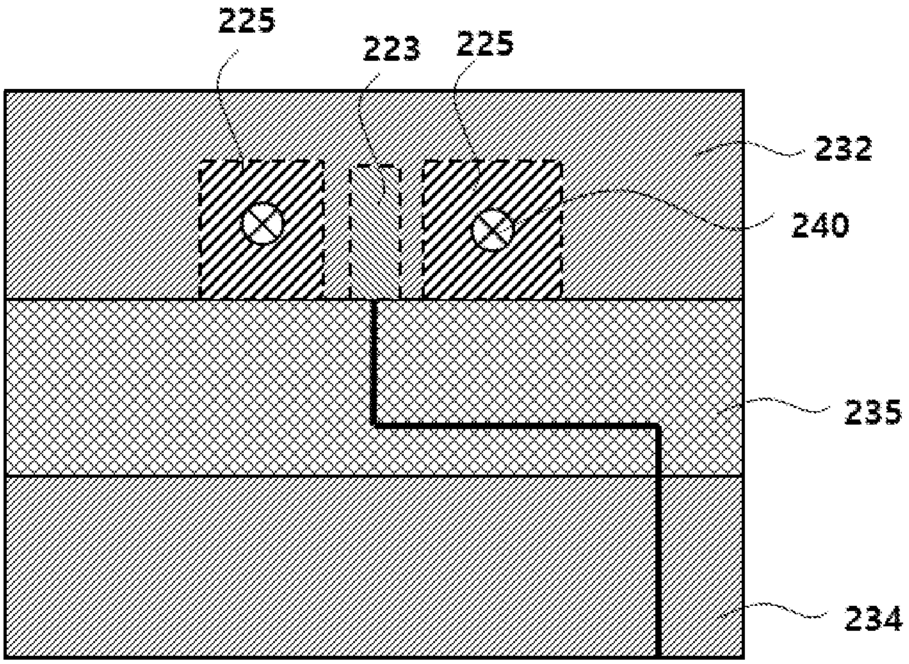
FIGS. 7 and 8 are a schematic top planar view and a schematic cross-sectional view, respectively, illustrating a flexible circuit board included in an antenna package in accordance with some exemplary embodiments.
Figure 8:
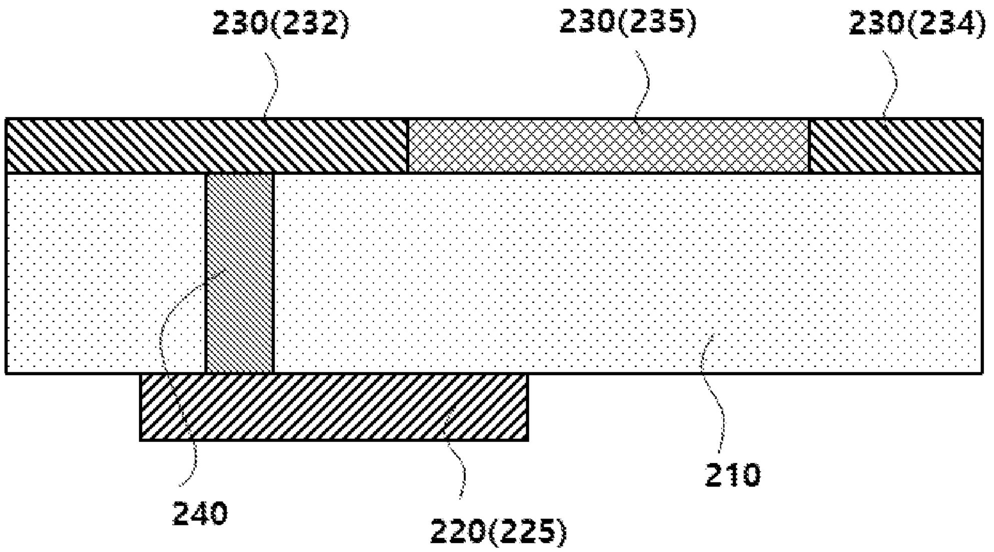

FIGS. 7 and 8 are a schematic top planar view and a schematic cross-sectional view, respectively, illustrating a flexible circuit board included in an antenna package in accordance with some exemplary embodiments. For example, FIG. 7 is a partially enlarged planar view of an area of the flexible circuit board 200 around the ground pattern 225.

Referring to FIGS. 7 and 8, a via structure 240 electrically connecting the ground layer 230 and the ground pattern 225 included in the circuit wiring layer 220 with each other may be formed. In exemplary embodiments, the via structure 240 may contact the ground pattern 225 and the first solid portion 232.

For example, a via hole penetrating through the core layer 210 may be formed, and the via hole may be filled with a metal by a plating process to form the via structure 240. The via hole may also penetrate the ground layer 230.

In an embodiment, the via structure 240 may be formed only in the via hole by, e.g., a button plating process. Thus, an increase of a thickness of the ground layer 230 caused when, e.g., a plating layer extends to an outside of the via hole may be prevented.

In an embodiment, the ground layer 230 may have a reduced thickness by, e.g., a half-etching process. In an embodiment, the ground layer 230 may have a smaller thickness than that of the circuit wiring layer 220.

As described above, the thickness of the ground layer 230 may be reduced to further enhance the bending property using the mesh structure included in the bending portion 235.

Figure 9:
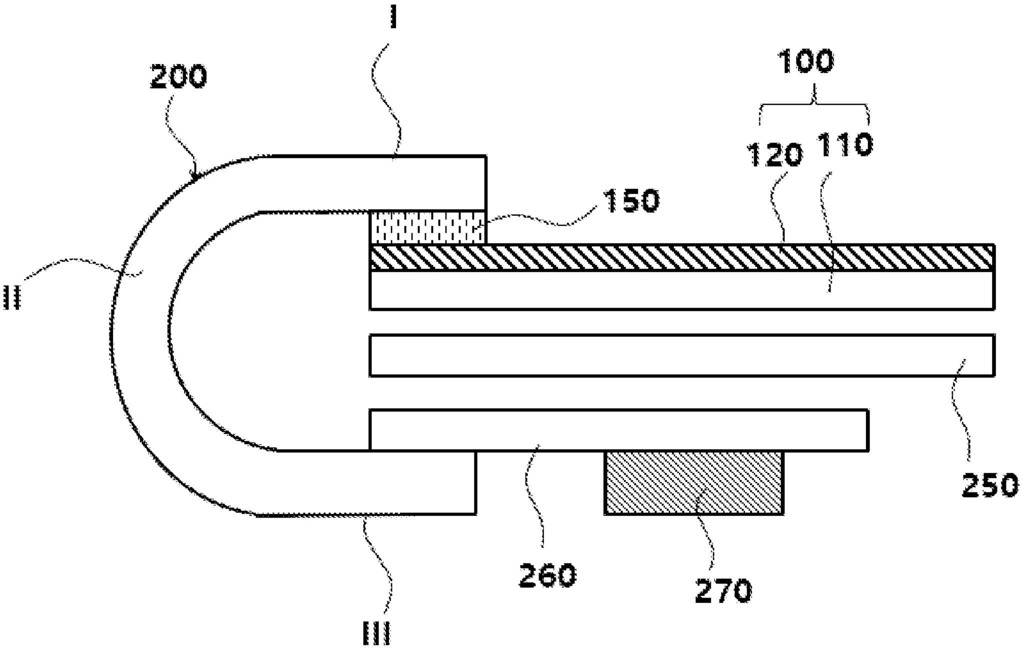
FIG. 9 is a schematic cross-sectional view illustrating an image display device including an antenna package in accordance with exemplary embodiments.

FIG. 9 is a schematic cross-sectional view illustrating an image display device including an antenna package in accordance with exemplary embodiments. For convenience of descriptions, illustrations of detailed elements and structures of the flexible circuit board 200 are omitted from FIG. 9.

The image display device may include a display panel 250 and the antenna package according to the above-described exemplary embodiments disposed on the display panel 250.

The display panel 250 may include, e.g., an OLED panel or an LCD panel, and preferably, may be an OLED panel. The antenna device 100 may be disposed on the display panel 250. The radiator 122 of the antenna unit 120 may be disposed on, e.g., a display area of the display panel 250 or the image display device. In this case, the radiator 122 may include a mesh structure to increase transmittance and suppress visual recognition of the antenna unit 120.

The signal pad 126 of the antenna unit 120 may be disposed on a bezel area or a peripheral area of the image display device or the display panel 250. The flexible circuit board 200 may be bonded to the signal pad 126 through the bonding region I, and may be bent downwardly under the display panel 250 through the bending region II.

As described above, the bending region II may include the mesh structure, so that the flexible circuit board 200 may provide improved bending stability. The body region III may enter a rear portion under the display panel 250 by the bending region II.

The signal wiring included in the body region III may be electrically connected to the antenna driving IC chip 270 via an intermediate circuit board 260. The intermediate circuit board 260 may include, e.g., a main board, a package board or a rigid printed circuit board.

The antenna driving IC chip 270 may be mounted on the intermediate circuit board 260 to supply a power to the antenna unit 120 through the flexible circuit board 200 and control an antenna radiation.

What is claimed is:

1. An antenna package comprising:

an antenna device comprising an antenna dielectric layer and an antenna unit disposed on the antenna dielectric layer; and a flexible circuit board electrically connected to the antenna unit, wherein the flexible circuit board comprises:

a core layer having a first surface and a second surface that face each other;

a circuit wiring layer disposed on the first surface of the core layer, the circuit wiring layer comprising a signal wiring electrically connected to the antenna unit; and a ground layer disposed on the second surface of the core layer to cover the circuit wiring layer in a planar view, the ground layer partially including a mesh structure, wherein at least a portion of the mesh structure of the ground layer does not overlap the antenna dielectric layer in the planar view, wherein the flexible circuit board has a bonding region bonded to the antenna device, a bending region and a body region, and the bending region is located between the bonding region and the body region, wherein the ground layer includes a first solid portion disposed on a portion of the core layer in the bonding region, a second solid portion disposed on a portion of the core layer in the body region, and a bending portion disposed on a portion of the core layer in the bending region, and the bending portion includes the mesh structure, wherein the antenna unit comprises a radiator, a transmission line extending from the radiator, a signal pad connected to one end portion of the transmission line and a ground pad disposed around the signal pad, and the circuit wiring layer of the flexible circuit board further comprises a ground pattern disposed around one end portion of the signal wiring to overlap the ground pad in the planar view.

2. The antenna package of claim 1, wherein the bending portion includes a mesh pattern formed of the mesh structure and a solid pattern.

3. The antenna package of claim 2, wherein the solid pattern overlaps the signal wiring in the planar view.

4. The antenna package of claim 1, further comprising a via structure penetrating the core layer and connecting the ground pattern and the first solid portion of the ground layer to each other.

5. The antenna package of claim 1, wherein the antenna device comprises a plurality of antenna units; and the signal wiring of the circuit wiring layer includes a plurality of signal wirings, each of which independently connected to each of the plurality of antenna units.

6. The antenna package of claim 5, wherein the signal wiring includes a bent portion, and the bent portion is disposed on a portion of the core layer in the bonding region.

7. The antenna package of claim 6, wherein the plurality of signal wirings extend in a length direction of the flexible circuit board continuously on the bending region and the body region of the core layer.

8. The antenna package of claim 6, further comprising an antenna driving integrated circuit chip disposed under the antenna device; and the flexible circuit board is bent under the antenna device by the bending region to be electrically connected to the antenna driving integrated circuit chip by the body region.

9. The antenna package of claim 8, further comprising an intermediate circuit board on which the antenna driving integrated circuit chip is mounted, wherein the intermediate circuit board is connected to the body region of the flexible circuit board.

10. An image display device, comprising:

a display panel; and the antenna package according to claim 1 disposed on the display panel.

11. The image display device of claim 10, further comprising an antenna driving integrated circuit chip disposed under the display panel, wherein a portion of the flexible circuit board including the mesh structure in the antenna package is bent to be electrically connected to the antenna driving integrated circuit chip.

* * * * *